Nov. 19, 1929.  P. F. BOYD  1,736,389
PORTABLE HORSE POWER
Filed May 23, 1928  2 Sheets-Sheet 1
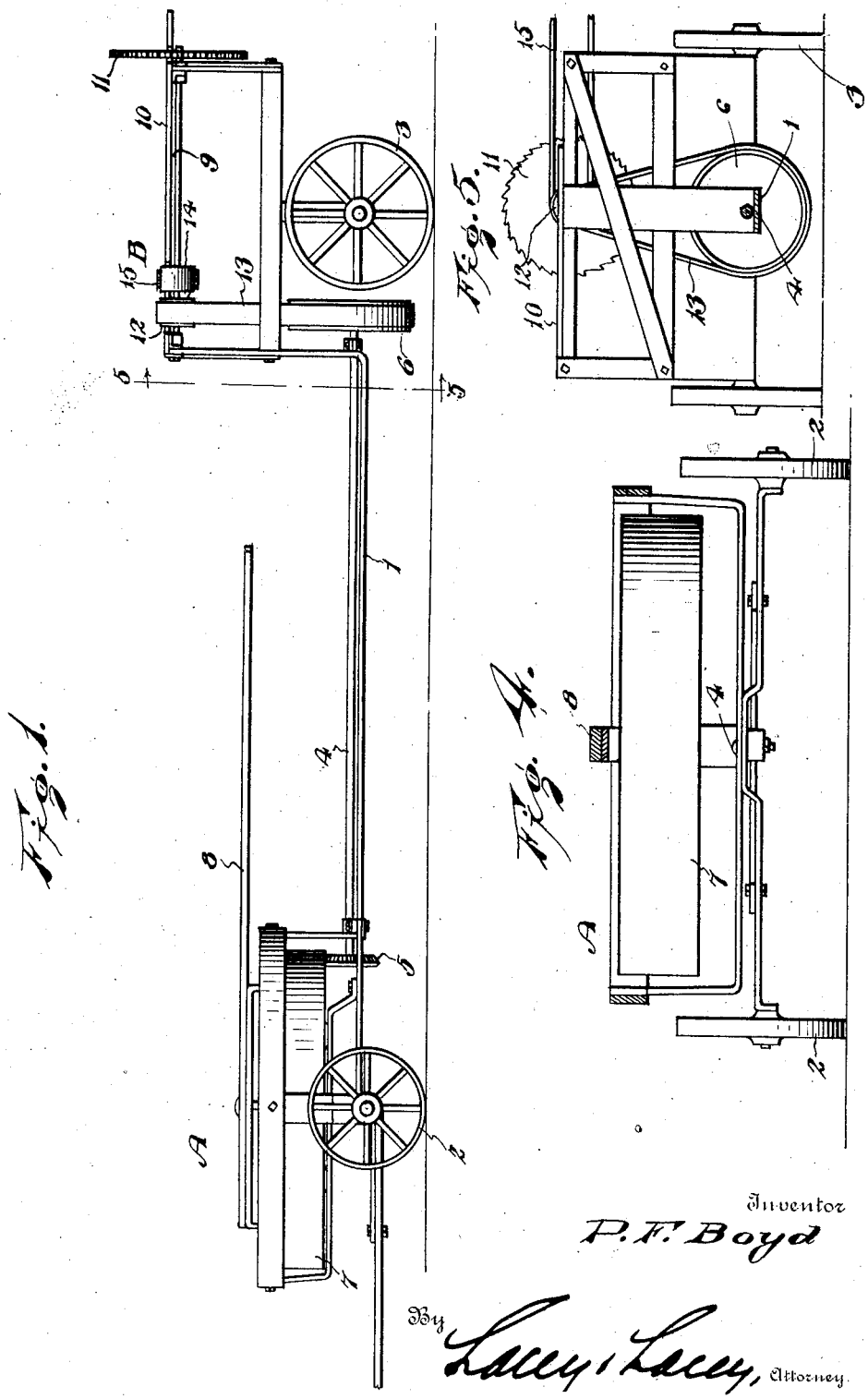
Inventor
P. F. Boyd
By Lacey & Lacey, Attorney

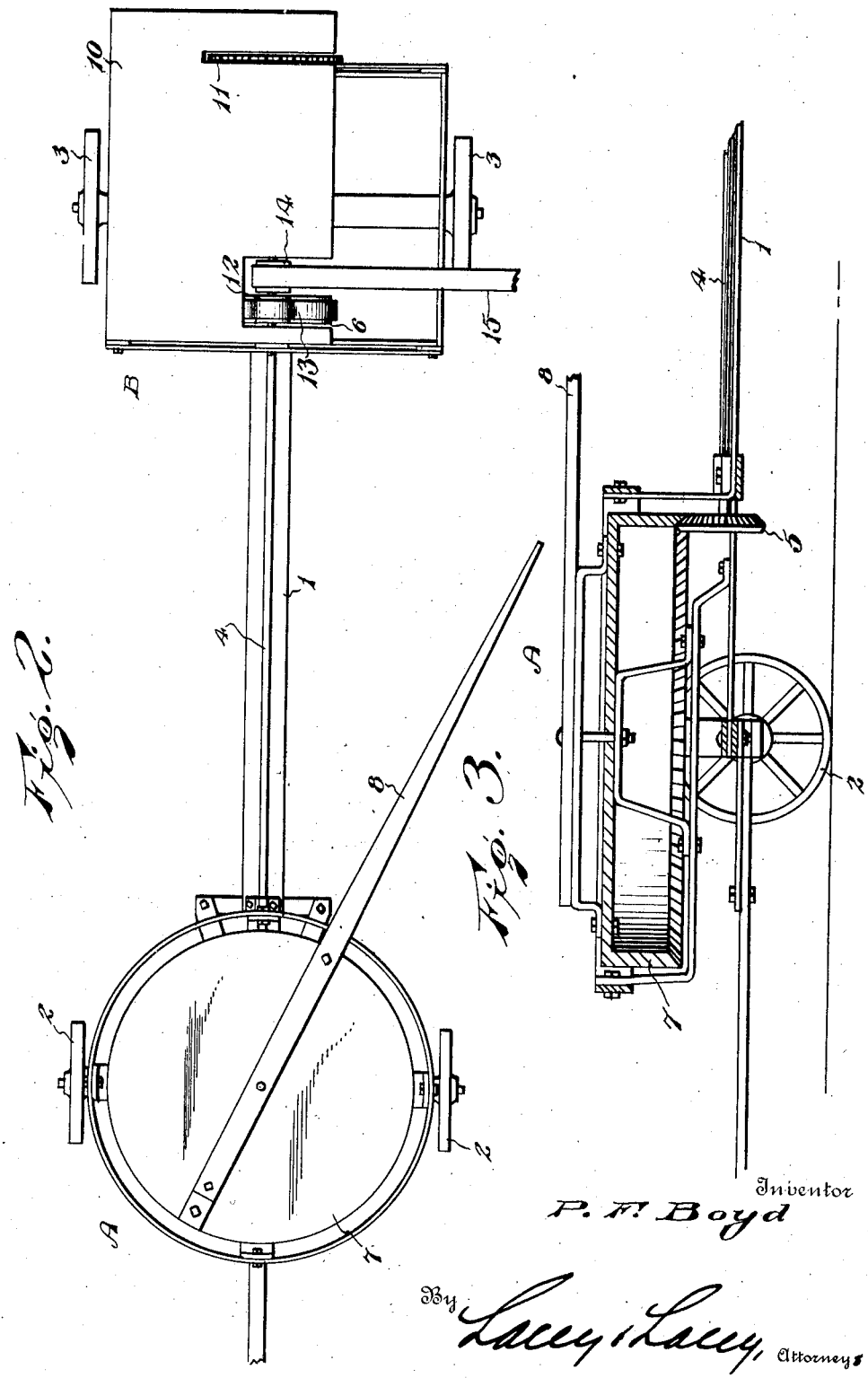

Patented Nov. 19, 1929

1,736,389

UNITED STATES PATENT OFFICE

PAUL F. BOYD, OF CHICAGO, ILLINOIS

PORTABLE HORSEPOWER

Application filed May 23, 1928. Serial No. 280,042.

This invention relates to motive means wherein the power is derived from a draft animal, such as a horse, hitched to a sweep and compelled to travel in a circle.

The invention provides a portable machine of the character aforesaid embodying two units coupled in a manner to form a single organized structure which is movable, as a whole, from place to place as required.

While the drawings illustrate a preferred embodiment of the invention it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a side view of a portable horse power embodying the invention.

Figure 2 is a top plan view.

Figure 3 is an enlarged sectional view of the power unit.

Figure 4 is a front view, partly in section and part omitted.

Figure 5 is a sectional view on line 5—5 of Figure 1, looking to the right as designated by the arrows.

Corresponding and like parts are referred to in the following description and designated in the several views of the drawing by like reference characters.

The machine includes a power unit A and a work unit B. These units are mounted upon trucks and are coupled by means of a reach 1 to form a single organized structure which may be readily moved as a whole from one place to another, as required. The power unit A is mounted upon a truck including wheels 2. The work unit B is likewise mounted upon a truck including wheels 3. The reach 1 connecting the two units is narrow and sufficiently low to permit of the animal stepping thereover when making the circuit.

A shaft 4 parallels the reach 1 and is journaled at its ends in suitable bearings provided upon the framework of the respective units. A gear wheel 5 is fast to the forward end of the shaft 4, and a pulley 6 is fast to the rear end. The numeral 7 denotes a large drive wheel which is mounted upon the framework of the power unit so as to rotate about a vertical axis. The teeth of the drive wheel 7 mesh with the teeth of the gear wheel 5, hence rotation of the drive wheel 7 imparts a corresponding movement to the shaft 4. Obviously, the shaft 4 rotates at a higher speed than the drive wheel 7 because of the different diameters of the coacting parts 5 and 7. A sweep 8 is connected at one end to the drive wheel 7 and the draft animal is adapted to be hitched to the outer end of the sweep in a manner well understood.

The work unit includes a mandrel 9 which is journaled in suitable bearings provided upon the framework. The numeral 10 denotes a work table. A circular saw 11 is mounted upon an end of the mandrel 9 and secured thereto in any determinate way to rotate therewith. A pulley 12 is fast to the opposite end of the mandrel 9 and is connected to the pulley 6 by means of a drive belt 13. In this manner rotary movement imparted to the shaft 4 is transmitted to the mandrel 9 and circular saw 11. Obviously, power may be taken from the mandrel 9 to operate any machine or part to be driven. The construction is such as to admit of the machine as a whole being readily transported from one point to another as occasion may require.

A pulley 14 fast to the mandrel 9 provides convenient means for taking off power by means of a belt 15 to operate any part to be driven.

Having thus described the invention, I claim:

1. A portable horse power comprising a power unit, and a work unit, each of the units being mounted upon trucks, narrow low-down coupling means connecting the two units to admit of an animal stepping readily thereover, and transmission means connecting the drive element of the power unit with the driven element of the work unit.

2. A portable horse power comprising a power unit and a work unit, each of the units including a framework mounted upon a truck, coupling means connecting the two units and sufficiently low and narrow to admit of an animal readily stepping thereover, a drive wheel mounted upon the framework of the power unit, a sweep connected thereto, a mandrel mounted upon the framework of the work unit, a shaft journaled at its ends to the framework of the respective units, and connecting means between the shaft and the said drive wheel and mandrel, 3. A portable horse power including a power unit and a work unit, each of the units comprising a framework and a truck, a low down narrow reach connecting the two units to admit of an animal stepping readily thereover, a drive wheel mounted upon the framework of the power unit, a mandrel mounted upon the framework of the work unit, a shaft paralleling the reach and mounted at its ends in the framework of the respective units, connecting gearing between the said shaft and the drive wheel, and connecting means between the opposite end of the shaft and the said mandrel.

In testimony whereof I affix my signature.

PAUL F. BOYD. [L. S.]